United States Patent [19]

Chiu et al.

[11] 4,284,972
[45] Aug. 18, 1981

[54] VEHICLE MILEAGE INTERVAL DETECTOR

[75] Inventors: Randolph K. Chiu, Davison; Douglas A. Stiff, Burton; Francis G. Cox, Grand Blanc, all of Mich.

[73] Assignee: General Motors Corporation, Detroit, Mich.

[21] Appl. No.: 92,745

[22] Filed: Nov. 9, 1979

[51] Int. Cl.³ .................. B60Q 1/00; G01D 13/00; G08B 5/00
[52] U.S. Cl. .................. 340/52 D; 200/56 R; 235/97; 235/132 E; 307/10 R; 338/67; 338/92; 338/127; 340/688
[58] Field of Search .................. 340/52 D, 52 R, 52 F, 340/688, 23; 235/95 R, 132 E, 92 MT, 92 PE, 92 T, 97; 307/10 R; 338/67, 77, 79, 92, 120, 127; 200/56 R, 61.39, 61.58 R

[56] References Cited
U.S. PATENT DOCUMENTS

| | | | |
|---|---|---|---|
| 1,564,583 | 12/1925 | Koudriavzeff et al. | 340/52 D X |
| 2,319,494 | 5/1943 | Dusdieker | 200/56 R |
| 2,827,621 | 3/1958 | Reichert et al. | 340/688 X |
| 2,928,186 | 3/1960 | Hirsch | 340/23 X |
| 2,950,364 | 8/1960 | Hayes | 340/688 X |
| 3,129,416 | 4/1964 | Freedman | 340/688 |
| 3,911,855 | 10/1975 | Haven | 340/52 D |
| 3,925,754 | 12/1975 | Ota et al. | 340/52 D |
| 3,940,735 | 2/1976 | Kronenberg | 340/52 D |
| 3,972,022 | 7/1976 | Goto et al. | 340/52 D |
| 3,984,976 | 10/1976 | Nagai | 60/274 |
| 4,159,531 | 6/1979 | McGrath | 340/52 D |

Primary Examiner—John W. Caldwell, Sr.
Assistant Examiner—Joseph E. Nowicki
Attorney, Agent, or Firm—Warren D. Hill

[57] ABSTRACT

An apparatus for providing a service reminder when a vehicle has accumulated a predetermined mileage comprises a potentiometer operated by the highest order number wheel of the vehicle odometer to provide an output voltage which changes incrementally with each indexing motion of that number wheel. An electrical detector responsive to the potentiometer output energizes a signal lamp when the output reaches a voltage in a predetermined range representing a desired service interval. An electrical connector in circuit with the potentiometer can be disconnected to change the potentiometer voltage to a value outside the predetermined range to allow the service reminder circuit to turn off the indicator lamp when the indicated service has been performed. The apparatus is adapted to operate in conjunction with an electronic engine control module which can be programmed to detect the predetermined value of the potentiometer output and to operate a signal lamp. The potentiometer output in addition provides information to the electronic control module on the accumulated mileage of the vehicle.

3 Claims, 5 Drawing Figures

VEHICLE MILEAGE INTERVAL DETECTOR

This invention relates to a vehicle service reminder system and particularly to such a system for actuating a service reminder signal in response to rotation of a mechanical odometer.

As is well known, many components of an automotive vehicle require periodic servicing. Usually routine maintenance items such as lubrication are left to the memory of the vehicle operator. It has been suggested, however, that a positive reminder should be provided for certain infrequently serviced maintenance items such as those related to emission control or engine operation in order to optimize the benefit of those systems. For example, if a vehicle equipped with a catalytic converter requires replacement of the catalyst at 50,000 miles, a service reminder can be provided in the form of a warning lamp which illuminates a reminder legend when the vehicle has accumulated 50,000 miles. Some catalytic converter equipped vehicles are further equipped with an electronic engine control module of the closed loop variety such as that shown in the U.S. Pat. No. to Bowler et al 4,130,095 which uses an oxygen sensor at the exhaust output of the catalytic converter for providing information to the engine control relevant to the air-fuel stoichiometry. Maximum benefit from the engine control system depends upon a proper operation of the oxygen sensor; to assure proper operation some sensors should be replaced at 30,000 mile intervals. It is thus desirable to provide an oxygen sensor service reminder at 30,000 and 60,000 miles, for example. In such electronic engine control modules the oxygen sensor or some other components may vary in response or efficiency according to the age of the vehicle and if the age or mileage of the vehicle is part of the input data of the engine control module, the module can be programmed to compensate for aging. Thus, it is desirable to provide accumulated mileage information to the engine control module on a continuous basis.

It is, therefore, a general object of this invention to provide in a vehicle having a mechanical odometer a service reminder circuit for energizing a signal when a preset distance is registered by the odometer. It is a further object of the invention to provide in such a service reminder circuit an arrangement for manually de-energizing the signal when the service has been performed. It is still another object of the invention to provide in such a circuit a continuous electrical output containing information on the accumulated vehicle mileage.

The invention is carried out in a vehicle having a mechanical odometer by providing a resistor circuit with a movable contact driven by an odometer to produce an output voltage dependent on the distance registered by the odometer, a detector responsive to the output voltage for actuating a signal device when the output voltage reaches a value representative of a distance where a service reminder is desired, and means for manually adjusting the output voltage to a value effective to deactuate the signal device. The invention is further carried out by providing from the resistor circuit a continued voltage output generally representative of the accumulated vehicle mileage.

The above and other advantages will be made more apparent from the following specification taken in conjunction with the accompanying drawings wherein like reference numerals refer to like parts and wherein.

Figure 1:
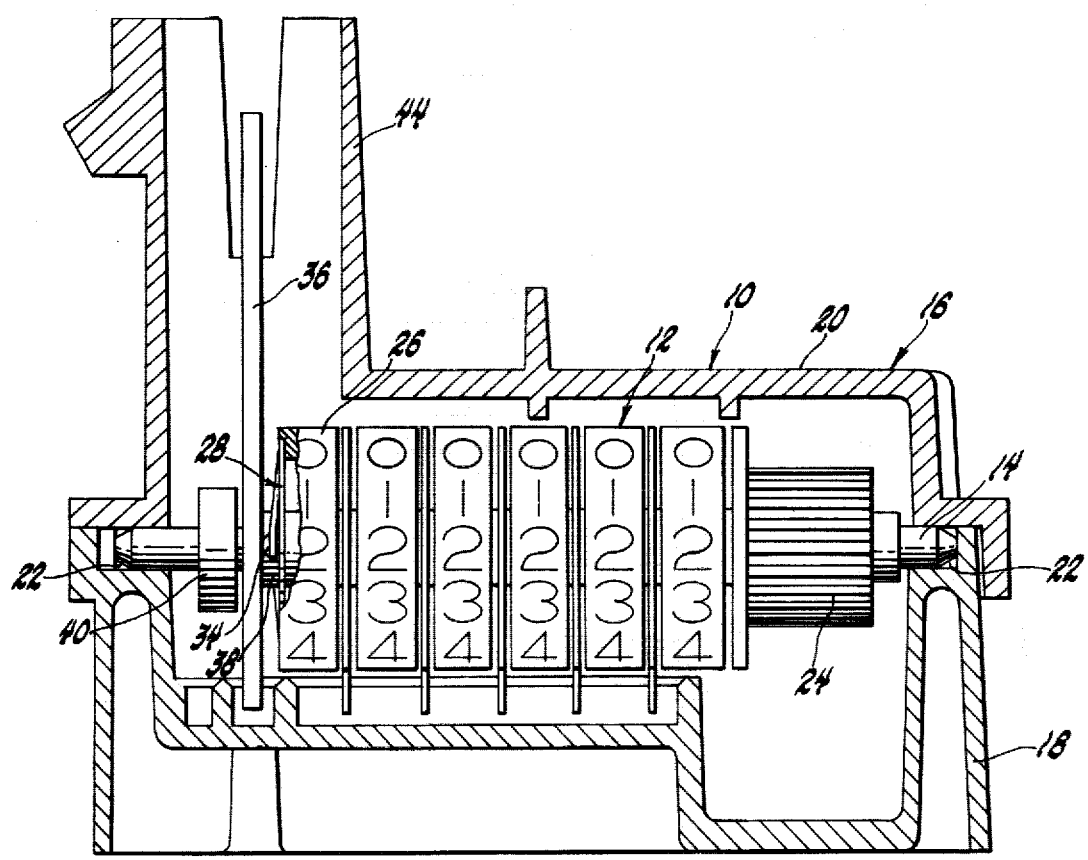
FIG. 1 is a cross-sectional view of a mechanical odometer incorporating a potentiometer according to the invention.
Figure 2:
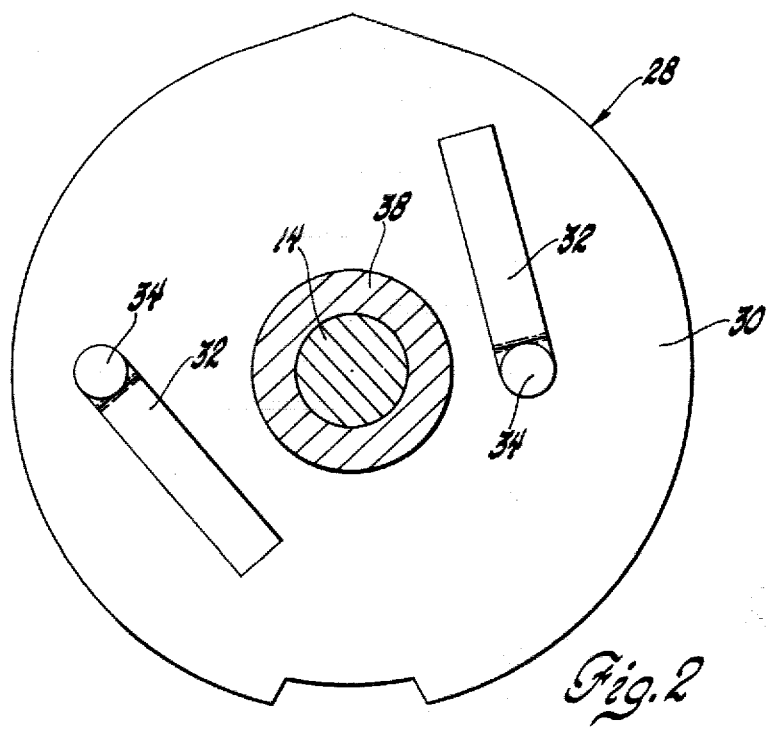
FIG. 2 is a view of a potentiometer contact element for the potentiometer of FIG. 1.

Referring to FIG. 1 a mechanical odometer 10 comprises a series of six number wheels 12 having a conventional mechanical drive mechanism, not shown. The number wheels 12 are supported by a central shaft 14 which is mounted in a housing 16 comprising two parts 18 and 20. The two parts when assembled define a pair of pockets 22 for receiving the two ends of the shaft 14. A gear 24 near the right end of the shaft 14 forms a portion of the conventional mechanical drive arrangement. The extreme right number wheel adjacent the gear 24 customarily represents the least significant digit of the odometer display such as tenth of miles. The extreme left number wheel 26 is the highest order number wheel and typically represents ten thousand mile increments. Thus for every ten thousand miles traversed by the vehicle, the number wheel 26 is indexed one tenth revolution. The number wheel 26 is partially sectioned to reveal a wiper element 28 supported on the left hand face thereof. As further shown in FIG. 2, the wiper element comprises a plate 30 having two flexible wiper fingers 32 each extending outwardly therefrom at an angle and terminating in contact tips 34 disposed on opposite sides of the shaft 14 at different radial distances therefrom. A printed circuit board 36, better shown in FIG. 3, carries a resistor circuit facing the number wheel 28 for engagement by the contact tips 34. A fixed washer 38 on the shaft 14 between the number wheels and one face of the circuit board locates the circuit board 36 relative to the number wheel 26 and a collar 40 press fit on the shaft adjacent the other face of the circuit board 36 defines the endplay of the assembly. The circuit board 36 contains an aperture 42 receiving the shaft 14. The circuit board is generally rectangular in shape and extends toward the back of the odometer into a housing projection 44 which comprises an adaptor for coupling an electrical connector with the circuit board 36.

Figure 3:
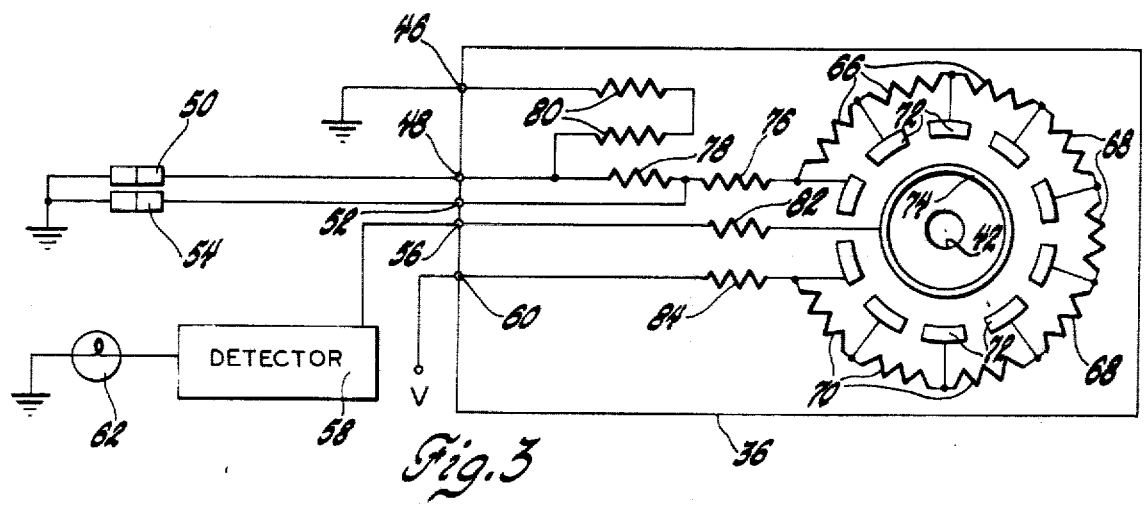
FIG. 3 is a combined schematic and diagrammatic view of the potentiometer circuit coupled with external circuitry to comprise a service reminder system according to the invention.
Figure 4:
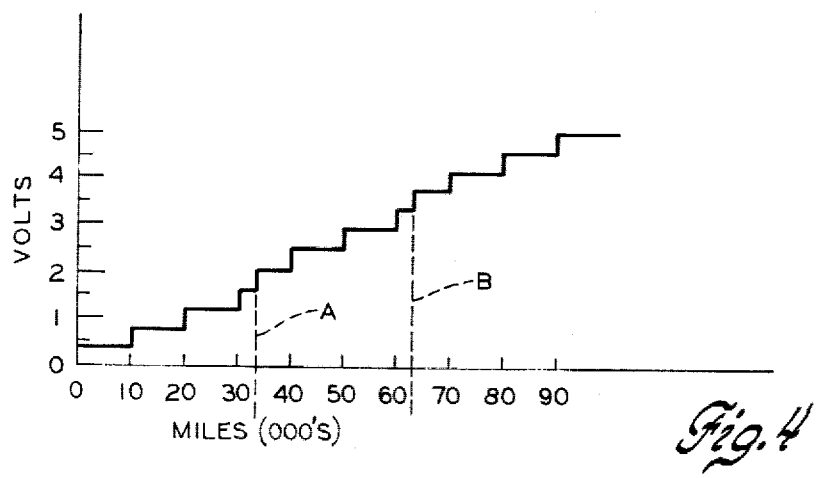
FIG. 4 is a graph of potentiometer output voltage varying according to vehicle mileage.
Figure 5:
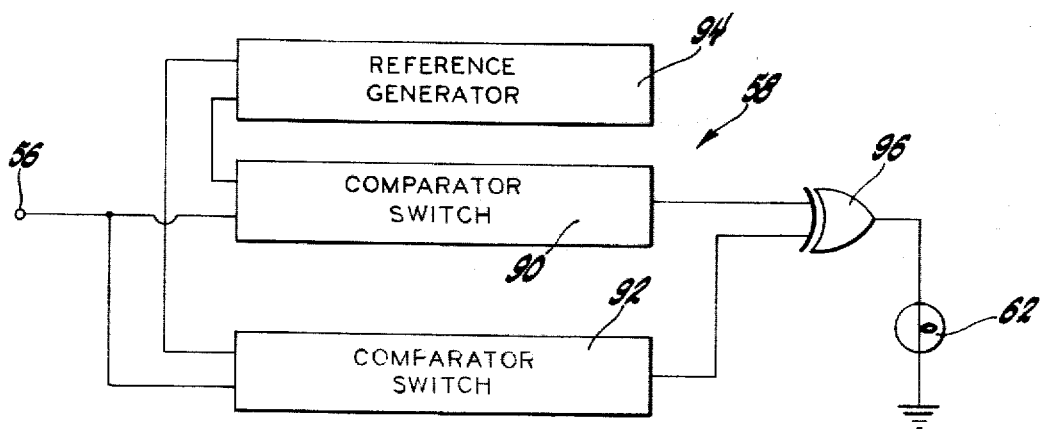
FIG. 5 is a block diagram of the detector circuit of FIG. 3.

Referring especially to FIG. 3, the printed circuit board carries a resistor circuit having a terminal 46 connected directly to ground, a terminal 48 connected through a separable connector 50 to ground, a terminal 52 connected through another separable connector 54 to ground, a terminal 56 connected to a detector 58 and a terminal 60 connected to a source of regulated voltage V. The detector 58 output is connected to an indicator lamp 62. The separable connectors 50 and 54 are located remote from the odometer and readily accessible by a service technician. The resistor circuit is depicted schematically but preferably comprises a network of printed resistors and conductors. It includes a circular array of nine resistors identified in the drawings as three groups of resistors 66, 68 and 70 which are concentric with the aperture 42 in the circuit board. A group of contact pads 72 formed in a circular array of diameter smaller than the resistor array are respectively connected to the junctions of the resistors 66, 68 and 70, and a concentric conductive annulus 74 of smaller diameter than the contact pad array forms the innermost portion of the circuit. One of the contact tips 34 of the wiper element 28 is always in conductive engagement with the conductive annulus 74 while the other contact tip 34 selectively engages the contact pads 72 according to the angular position of the number wheel 26. The terminal 52 of the resistor circuit is connected through a resistor 76 to the first of the resistors 66. The terminal 48 is connected through a resistor 78 to terminal 52 and the terminal 46 is connected through a pair of resistors 80 to the terminal 48. The pair of resistors function as a single resistor but are formed in pairs for printing convenience. The terminal 56 is connected through a resistor 82 to the conductive annulus 74 and the terminal 60 is connected through a resistor 84 to the last resistor 70 of the circular array. Thus, the potential at any of the contact pads 72 depends upon its position in the voltage dividing network and upon whether the connectors 50 and 54 or either of them are connected. As the wiper element 28 rotates with the number wheel 26, the contact pads 72 are sequentially connected to the annular conductor 74 so that the output voltage at terminal 56 increases stepwise in increments determined by the value of the several resistors as generally indicated by the voltage graph shown in FIG. 4. The detector 58 is arranged to energize the lamp 62 whenever the voltage at the terminal 56 is in a predetermined range which represents a certain accumulated mileage. An example of such a detector is illustrated in FIG. 5 which comprises comparator switches 90 and 92 with reference voltages supplied by a reference generator 94, the outputs of the switches being fed to an exclusive OR circuit 96 which drives the lamp 62. The comparator switch inputs are connected to the terminal 56 of the circuit board. The reference voltages supplied by the reference generator 94 are relatively close together and bracket the predetermined voltage so that when that voltage is attained, one of the switches will be turned on to enable the exclusive OR gate 96, whereas for voltages outside that range both switches will be on or off thereby disabling the gate 96. To provide indications at other voltage levels, of course, additional sets of comparator switches and exclusive OR gates can be incorporated in the detector.

In operation, when the number wheel 26 rotates to a position which applies the predetermined voltage to the detector 58, the lamp 62 is energized to illuminate a legend which reminds the operator to perform the indicated service. When the service is completed, it is desired then to extinguish the indicator lamp and this is accomplished by disconnecting the connector 54. That action effectively places the resistor 78 in series with the resistors 66 at the lower end thereof so that the voltage at each contact pad 72 increases by an amount to raise the potential at the detector input to a value outside the predetermined range of the detector so that the lamp 62 is extinguished. Similarly, at a second higher voltage level, the lamp may again be energized by the detector and the other connector 50 may then be disconnected to include the resistor pair 80 in the potentiometer circuit to again raise the voltage to the detector to a value outside the detector range.

To provide a uniform voltage increment at each indexing of the number wheel 26 (taking into account the effects of varying the resistor circuit by disconnecting the connectors 50 and 54) the ratio of the resistor values must be carefully proportioned. As a specific example of a service reminder for an oxygen sensor which requires servicing at 30,000 and 60,000 miles, the resistor 76 should have a value R (say about 250 ohms) and the resistors 66 should likewise have the value R. The three resistors 68 should have the value 1.1 R and the resistor 70 as well as the resistor 84 should have the value 1.4 R. The resistor 78 is equal to 1.6 R and the pair of resistors 80 in total equal 3.6 R. The resistor 82 is about 2.5 R, however, it is expected that the input impedance of the detector 58 be very large so that only insignificant current is drawn by the detector and the potential of the terminal 56 is independent of the detector current. Then if the regulated voltage source is set at five volts and the connectors 50 and 54 are connected, the output voltage at terminal 56 will be 0.384 volts at 0 miles and will increment to 0.772 volts at 10,000 miles. Further increments at 20,000 and 30,000 miles will be the same size so that about 1.55 volts will be applied to the detector at 30,000 miles. If the detector is set to respond to a voltage range of 1.4 to 1.7 volts, the lamp 62 will be illuminated when the 30,000 mile value has been registered. The lamp illumination provides the indication that the oxygen sensor service is required. After the service is performed, the connector 54 is disconnected to increase the detected voltage to 1.93 volts as shown in FIG. 4 at point A. It should be noted that if the connector 50 is mistakenly disconnected instead of connector 54, no change in the circuit resistance occurs and the lamp 62 will not be extinguished thereby advising the technician of the error. Further as shown in FIG. 4, similar voltage increments occur at higher mileages and that when the lamp is again energized at 60,000 miles the connector 50 may be opened at point B to extinguish the lamp. It should be noted that additional service reminder points may be employed by suitable design of the detector and that the same lamp or different lamps may be employed depending upon the specific message to be given.

The detector 58 as revealed in FIG. 5 is conveniently an analog circuit but may just as well be a digital circuit. It is convenient when using the service reminder circuit in conjunction with an electronic answering control module that the module itself be programmed to detect the voltage at the terminal 56 and to illuminate whatever message lamp is required. To that end it may be noted that the above mentioned U.S. Pat. No. 4,130,095, FIG. 9, is well adapted to the incorporation of such a function since it requires only an additional input to the multiplex circuit, additional memory and comparator switches and the exclusive OR logic to carry out the function suggested by FIG. 5. A particular advantage of the subject circuit is that the output of distinctive voltages at each 10,000 mile interval is useful to supply information to the engine control module regarding the accumulated mileage of the vehicle in order to make programming compensations for the degradation or other aging changes of the system components. Since the output of the circuit is dependent upon the contents of the mechanical odometer, the odometer serves as a permanent memory for the engine control module and is not affected by power interruptions such as those occurring when the vehicle battery is disconnected for replacement.

It will thus be seen that the invention provides a service reminder circuit which is readily designed to provide a warning at one or more vehicle mileage values and which may utilize the detection and computational features of an available engine control module or may be an entirely separate circuit of either analog or digital design. It is further seen that the reminder circuit provides a persistent signal which may, however, be manually extinguished to prevent its operation after the indicated service has been performed.

The embodiments of the invention in which an exclusive property or privilege is claimed are defined as follows:

1. In a vehicle having a mechanical odometer comprising a series of number wheels for indicating elapsed distance, a service reminder circuit for actuating a signal device when a preset distance has elapsed, comprising a voltage source, a potentiometer connected to the voltage source including a resistor circuit, and a movable contact element in wiping engagement with the resistor circuit and carried by one of the odometer number wheels whereby an output voltage is produced which varies with movement of the one odometer wheel, a voltage sensitive detector means responsive to the said output voltage for actuating the said signal device when the output voltage has a value within a preset voltage range representative of the said preset distance, and manually adjustable circuit means electrically connected with the resistor circuit for changing the potentiometer output voltage to a value outside the preset voltage range to manually deactuate the said signal device.

2. In a vehicle having a mechanical odometer comprising a series of number wheels for indicating elapsed distance, a service reminder circuit for actuating a signal device when a preset distance has elapsed, comprising a voltage source, a potentiometer connected to the voltage source including a resistor circuit, and a movable contact element in wiping engagement with the resistor circuit and carried by one of the odometer number wheels whereby an output voltage is produced which varies with movement of the one odometer wheel, a voltage sensitive detector means responsive to the said output voltage for actuating the said signal device when the output voltage has a value within a preset voltage range representative of the said preset distance, and manually adjustable circuit means connected with the potentiometer including a resistor in series with the potentiometer and a shunt circuit normally across the resistor whereby the shunt circuit is adapted to be opened manually for changing the potentiometer output voltage to a value outside the preset voltage range to deactuate the said signal device.

3. In a vehicle having a mechanical odometer comprising a series of number wheels for indicating elapsed distance, a service reminder circuit for actuating a signal device when a preset distance has elapsed, comprising a voltage source, a potentiometer connected to the voltage source including a printed circuit board incorporating an arcuately arranged resistor circuit and a concentric arcuate conductor and a movable contact element in bridging engagement with the resistor circuit and the arcuate conductor and carried by the highest order odometer number wheel whereby an output voltage is produced on the arcuate conductor which varies with rotation of the said odometer wheel, a voltage sensitive detector means responsive to the said output voltage for actuating the said signal device when the output voltage has a value within a preset voltage range representative of the said preset distance, and manually adjustable circuit means electrically connected with the resistor circuit for changing the potentiometer output voltage to a value outside the preset voltage range to manually deactuate the said signal device.

* * * * *